US009734162B2

(12) United States Patent
Statchuk (10) Patent No.: US 9,734,162 B2
(45) Date of Patent: *Aug. 15, 2017

(54) GEOSPATIAL QUERIES USING ASSOCIATED DISTRIBUTION DATA

(71) Applicant: International Business Machines Corporation, Armonk, NY (US)

(72) Inventor: Craig A. Statchuk, North Gower (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/080,630

(22) Filed: Mar. 25, 2016

(65) Prior Publication Data

US 2016/0210311 A1  Jul. 21, 2016

Related U.S. Application Data

(63) Continuation of application No. 14/159,528, filed on Jan. 21, 2014, now Pat. No. 9,336,236.

(51) Int. Cl.
*G06F 17/30* (2006.01)

(52) U.S. Cl.
CPC .. *G06F 17/30241* (2013.01); *G06F 17/30466* (2013.01)

(58) Field of Classification Search
CPC ......... G06F 17/30241; G06F 17/30442; G06F 17/30454; G06F 17/30463; G06F 17/30498; G06F 17/3087; G06F 17/30466
USPC ................ 707/713, 714, 724, 743, E17.054
See application file for complete search history.

(56) References Cited

U.S. PATENT DOCUMENTS

| 7,315,849 | B2 | 1/2008 | Bakalash et al. |
| 8,037,059 | B2 | 10/2011 | Bestgen et al. |
| 8,041,670 | B2 | 10/2011 | Bakalash et al. |
| 8,170,984 | B2 | 5/2012 | Bakalash et al. |
| 8,996,464 | B2 | 3/2015 | Zhou et al. |
| 9,336,236 | B2 * | 5/2016 | Statchuk ........... G06F 17/30241 |
| 2005/0210023 | A1 * | 9/2005 | Barrera ............ G06F 17/30463 |

(Continued)

OTHER PUBLICATIONS

Choi, Yongchul (Kenneth), "Spatial OLAP Query Engine: Processing Aggregate Queries on Spatia OLAP Data", © Yongchul (Kenneth) Choi 2009, Simon Fraser University, Summer 2009, pp. 1-75, <http://summit.sfu.ca/item/9585>.

(Continued)

*Primary Examiner* — Greta Robinson
(74) *Attorney, Agent, or Firm* — Noah A. Sharkan (57) ABSTRACT

Embodiments of the present invention disclose a method, computer program product, and system for optimizing spatial queries, the method comprising a computer receiving a spatial data set, and a target spatial shape. The computer determining a distribution data set which aligns with the geometry of the spatial data set. The computer performing a query to determine a list of full and partial shapes of the spatial data set located within the target spatial shape. The computer determining a ratio for a determined partial shape of the spatial data set using the distribution data set. The computer determining an apportioned value of a variable of the spatial data set within the determined partial shape. The computer summarizing into a result set the value of the variable within the determined list of full and partial shapes of the spatial data set.

20 Claims, 6 Drawing Sheets

(56) References Cited

U.S. PATENT DOCUMENTS

| | | | |
|---|---|---|---|
| 2007/0198586 A1 | 8/2007 | Hardy et al. | |
| 2011/0320319 A1* | 12/2011 | Streich .................. | G06Q 30/06 705/27.1 |
| 2012/0054174 A1 | 3/2012 | Gagnier et al. | |
| 2012/0166446 A1* | 6/2012 | Bowman ........... | G06F 17/30327 707/743 |
| 2014/0280064 A1 | 9/2014 | McDougall et al. | |

OTHER PUBLICATIONS

Li et al., "Research on Optimized Spatial Data Query Algorithm in the Spatial Database", International Conference on Image Analysis and Signal Processing 2009, IASP 2009, 3 pages, 978-1-4244-3986-7/09, © 2009 IEEE.

Viswanathan et al., "OLAP Formulations for Supporting Complex Spatial Objects in Data Warehouses", Data Warehousing and Knowledge Discovery, Lecture Notes in Computer Science, vol. 6862/2011 pp. 39-50, 2011, Copyright Springer-Verlag Berlin Heidelberg 2011.

Statchuk, Craig A., "Geospatial Queries Using Associated Distribution Data", U.S. Appl. No. 14/159,528, filed Jan. 21, 2014, 45 pages.

"OpenGIS® Implementation Standard for Geographic information—Simple feature access—Part 2: SQL option", Open Geospatial Consortium Inc., Aug. 4, 2010, Reference No. OGC 06-104r4, Version 1.2.1, Copyright © 2010 Open Geospatial Consortium, Inc., pp. 1-111, <http://www.opengeospatial.org/legal/>.

IBM, "List of IBM Patents or Patent Applications Treated as Related", Appendix P, 2 pages, dated Mar. 25, 2016.

* cited by examiner

GEOSPATIAL QUERIES USING ASSOCIATED DISTRIBUTION DATA

FIELD OF THE INVENTION

The present invention relates generally to the field of data processing, and more particularly to optimizing the joining of geospatial data sets in queries.

BACKGROUND OF THE INVENTION

A geographic information system (GIS) is a system designed to capture, store, analyze, and present many types of data that are linked to a spatial location or area. In the simplest terms, GIS is the merging of cartography, statistical analysis, and database technology. Examples of data that are geographically oriented are population census blocks, county property tax maps, and postal zip codes.

A GIS is typically custom-designed for the needs of an organization, and the spatial boundaries of each data subset may be represented by squares, rectangles, polygons, curves, or other complex shapes. The shapes of spatial area boundaries may be jurisdictional, purpose, or application oriented. GIS uses spatial-temporal location as the key index variable for all information being collected into the GIS database. Location data may be recorded, for example, as dates/times of occurrence, along with a combination of longitude, latitude, and elevation. The coordinates ultimately refer to physical locations or items such as highway mile markers, surveyor benchmarks, or street intersections.

Generally, GIS applications are tools that allow users to create interactive searches, analyze spatial information, edit data in maps, and present the results of these operations. Examples of GIS software applications are Esri ArcGIS®, which is a commercial suite of GIS applications, and Natural Earth, which is an open source map data set. ArcGIS® is a registered trademark of Esri in the United States, the European Community, or certain other jurisdictions. The Open Geospatial Consortium (OGC), originating in 1994, developed standards for geospatial content and services, GIS data processing and data sharing. The OGC created a features and geometry specification, and sets standards for adding spatial functionality to database systems. A spatial database management system is optimized to store and query data that represents objects defined in a geometric space using a geometry or feature, such as a polygon representing a county border.

SUMMARY

Embodiments of the present invention disclose a method, computer program product, and system for optimizing spatial queries, the method comprising a computer receiving a first spatial data set and a target spatial shape, wherein the geometry of the first spatial data set does not align with the geometry of the target spatial shape. The computer determining a distribution data set, wherein the geometry of the distribution data set aligns with the geometry of the first spatial data set. The computer performing a query to determine a list of full and partial shapes of the first spatial data set which are located within the target spatial shape. The computer determining a ratio for a determined partial shape of the first spatial data set using the distribution data set. The computer determining an apportioned value of a variable of the first spatial data set within the determined partial shape, wherein the apportioned value of the variable is calculated by multiplying a full value of the variable with the determined ratio. The computer summarizing into a result set the value of the variable within the determined list of full and partial shapes of the first spatial data set.

DETAILED DESCRIPTION

As the amount of available geospatially keyed data increases, creating relevant geospatial query systems becomes more important, and can provide a competitive edge amongst competitors. Embodiments of the present invention recognize that each geospatially keyed data set is often prepared using a unique geometry; making queries of such data sets difficult whenever the joining of two or more geospatial data sets is required. Current geospatial queries involving more than one geometry or shape set may miss data or count some data more than once. Embodiments of the present invention provide for a geospatial query of geospatial data sets utilizing a geometry ratio calculator, and an associated distribution data set to optimize the summation of aggregated data within a joined data set. Implementation of embodiments of the invention may take a variety of forms, and exemplary implementation details are discussed subsequently with reference to the figures.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
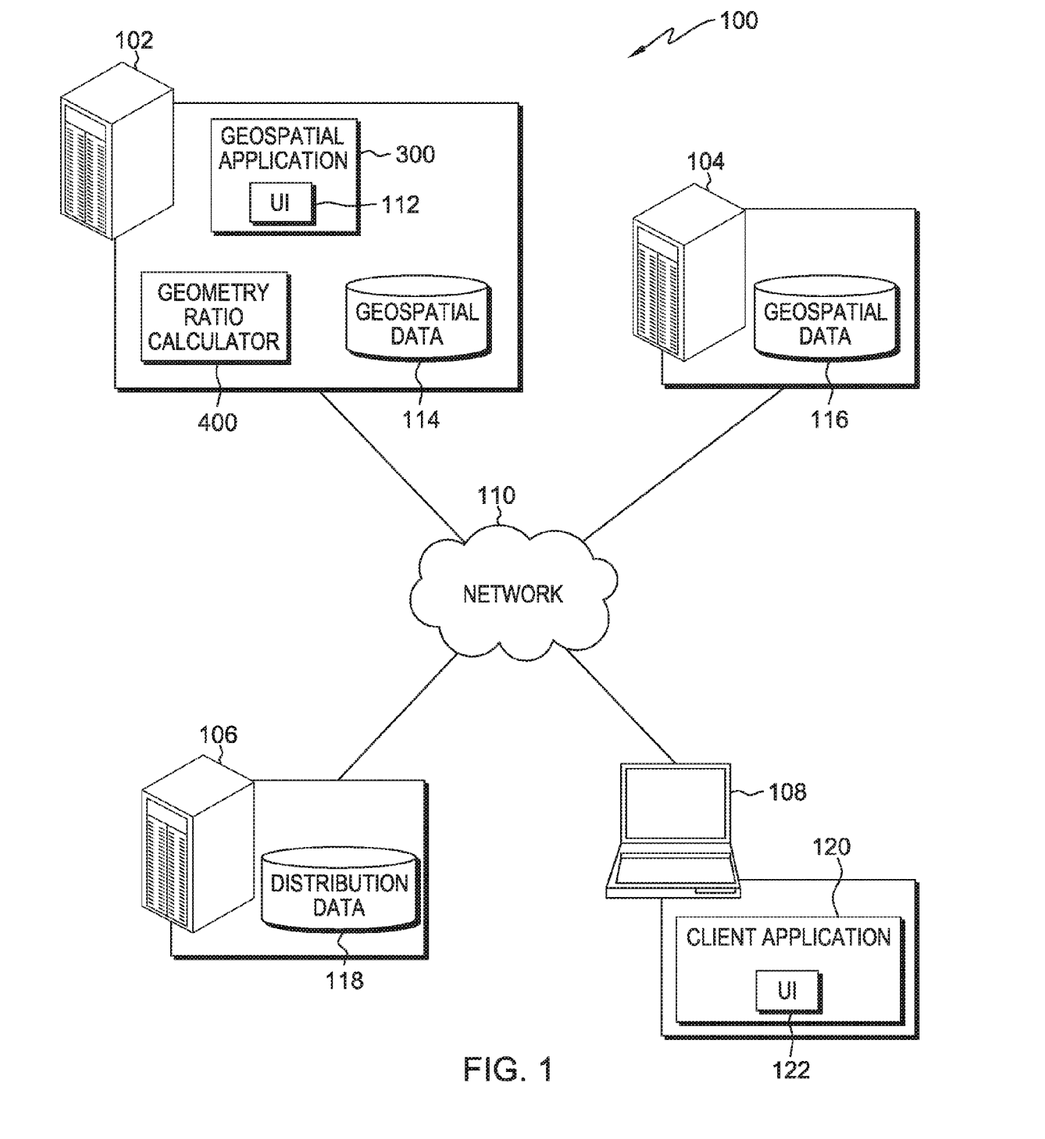
FIG. 1 is a block diagram illustrating a distributed data processing environment, in accordance with an embodiment of the present invention.

The present invention will now be described in detail with reference to the figures. FIG. 1 is a block diagram illustrating a distributed data processing environment, generally designated 100, in accordance with an embodiment of the present invention. Distributed data processing environment 100 includes server computers 102, 104, and 106, and client computer 108, interconnected over network 110.

Network 110 can be, for example, a local area network (LAN), a wide area network (WAN) such as the Internet, or a combination of the two, and can include wired, wireless, fiber optic, or any other connection known in the art. In general, network 110 can be any combination of connections and protocols that may support communications between server computers 102, 104, and 106, and client computer 108 in accordance with a desired embodiment of the present invention.

Server computers 102, 104, and 106 can each respectively be a specialized server computer, an application server, a laptop computer, a tablet computer, a netbook computer, a personal computer (PC), a desktop computer, a personal digital assistant (PDA), a smart phone, or any programmable electronic device capable of communicating with client computer 108, and the remaining server computers via network 110. In certain embodiments, server computers 102, 104, and 106 can each respectively represent a computer system utilizing clustered computers and components that act as a single pool of seamless resources when accessed via network 110, as is common in data centers and with cloud computing applications. In general, server computers 102, 104, and 106 can each respectively be representative of any programmable electronic device or combination of programmable electronic devices capable of executing machine-readable program instructions and communicating with other computing devices via network 110. Server computers 102, 104, and 106 may each be a node in a distributed database management environment. Server computers 102, 104, and 106 may each include internal and external hardware components, as depicted and described in further detail with respect to FIG. 5.

Server computer 102 includes geospatial application 300, geometry ratio calculator 400, geospatial data 114, and a user interface, such as UI 112. Geospatial application 300 uses UI 112 to receive user input, and to output responses to a user, such as a system administrator. In the depicted environment, geospatial application 300 is a suite of software tools including, but not limited to, a spatial database management system, authoring tools, viewing tools, deployment tools, and reporting tools. The spatial database management system includes an SQL parser, a query optimizer, a query engine, and geometry ratio calculator 400. In an embodiment of the present invention, geospatial application 300 processes a query utilizing geometry ratio calculator 400 to join two or more geospatial data sets with different geospatial map geometries with minimal loss or repetition of data. Geometry ratio calculator 400 may be fully integrated, partially integrated or completely separate from geospatial application 300. Geometry ratio calculator 400 is described further in FIG. 4A. Geospatial data 114 is a database of geospatially keyed data stored on server computer 102, or coupled to server computer 102 via network 110. Geospatial application 300 accesses geospatial data 116 and distribution data 118 via network 110. Geospatial application 300 is described further in FIG. 2.

In an embodiment, UI 112 uses a combination of technologies and devices, such as device drivers, to provide a platform to enable users of server computer 102 to interact with geospatial applications 300. UI 112 receives input, such as textual input received from a physical input device, such as a keyboard or mouse, via a device driver that corresponds to the physical input device. UI 112 may utilize a web page, command line processor, or any other GUI to connect to geospatial application 300. For example, a database administrator may use a command line processor via UI 112 to enter a data request in the form of an SQL (structured query language) statement.

Server computer 104 includes geospatial data 116. Geospatial data 116 is a database of geospatially keyed data stored on server computer 104, or coupled to server computer 104 via network 110.

Server computer 106 includes distribution data 118. Distribution data 118 is a database of geospatial related distribution data stored on server computer 106, or coupled to server computer 106 via network 110. For example, the distribution data may cover the same geospatial locations as geospatial data 114 or 116, but represents a different data set, such as the distribution of buildable land versus water.

Client computer 108 includes client application 120 which executes locally on client computer 108 and can interface with the user, via UI 122 created by client application 120, for the purpose of data entry, storage and retrieval. In various embodiments of the present invention, client computer 108 can be a laptop computer, a tablet computer, an application server, a netbook computer, a personal computer (PC), a desktop computer, a personal digital assistant (PDA), a smartphone, or any programmable electronic device capable of communicating with server computers 102, 104, and 106 via network 110.

In the depicted environment, client application 120 uses UI 122 to receive user input, and to output responses to a user. UI 122 may utilize a web page application, a command line processor application, or any other graphical user interface (GUI). Client application 120 sends information to and receives information from server computer 102 over network 110. Client application 120 may be any program capable of connecting to geospatial application 300 and requesting geospatial application 300 to perform some task. Client application 120 may be an associated client application created by the vendor or developer of geospatial application 300 for use in a server-client environment. Client application 120 may be part of a business intelligence (BI) and performance management (PM) software suite providing report authoring in a graphical environment. The graphical environment may represent data sets with icons which the user can drag and drop onto each other to create queries.

User interface, UI 122, includes components used to receive input from a user and transmit the input to client application 120 residing on client computer 108. In an embodiment, UI 122 uses a combination of technologies and devices, such as device drivers, to provide a platform enabling users of client computer 108 to interact with client application 120. In various embodiments, UI 122 receives input, such as textual input received from a physical input device, such as a keyboard or mouse, via a device driver that corresponds to the physical input device.

In the illustrative embodiment of FIG. 1, geometry ratio calculator 400, and geospatial data 114 are on server computer 102 with geospatial application 300. In other embodiments of the present invention, geospatial application 300, geometry ratio calculator 400, geospatial data 114, geospatial data 116, and distribution data 118 may be on one computer, or more than one computer, and each item itself may be split into a plurality of parts and spread across more than one computer. In any configuration, the following is maintained: geospatial application 300 is connected to geospatial data 114, geospatial data 116, distribution data 118 and geometry ratio calculator 400.

In various embodiments, geospatial application 300 receives a request for data from a requestor over network 110, processes the request, and sends results back to the requestor. For example, geospatial application 300 running on server computer 102 receives a request for data from client application 120 running on client computer 108 via network 110. Additionally a request for data may come from within geospatial application 300 running on server computer 102.

Geospatial application 300 formats the data request into a query which requires the joining of geospatial data 114 and geospatial data 116. Geospatial application 300 uses geometry ratio calculator 400 to apportion the requested data utilizing distribution data 118. Geospatial application 300 sends the requested data back to the originating requestor, i.e., client application 120, or a tool within geospatial application 300. Geometry ratio calculator 400 is described further in FIG. 4A.

FIGS. 2A-2E are illustrations of geospatial maps for the purpose of depicting a join of two geospatial data sets, in accordance with an embodiment of the present invention. In the illustrative embodiment, geospatial application 300 running on server computer 102 receives a request for data from client application 120 running on client computer 108 via network 110. The request includes criteria provided by the user for selecting a subset of data from geospatial data 114 and geospatial data 116.

Figure 2A:
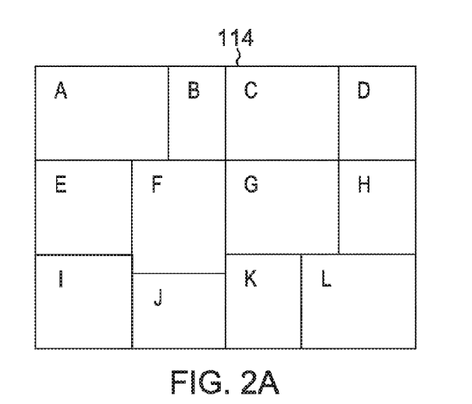
FIG. 2A is an illustration of a first geospatial data set, in accordance with an embodiment of the present invention.
Figure 2B:
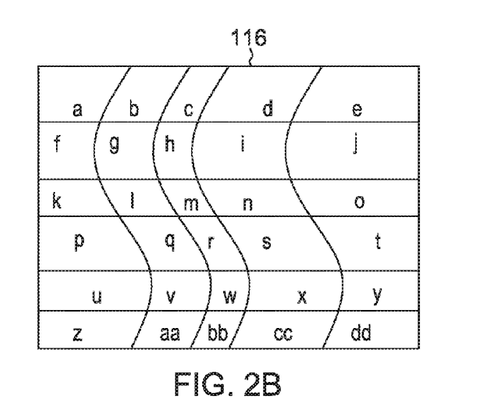
FIG. 2B is an illustration of a second geospatial data set, in accordance with an embodiment of the present invention.

FIG. 2A represents geospatial data 114, and may contain county census data, such as household income, number of people per residence, number of houses per county, etc. In the illustrative example, the areas labeled A through L represent individual counties. FIG. 2B represents geospatial data 116, and may contain school district data including mailing addresses, and number of school-age children. In the example, the areas labeled a through dd represent school districts. In an illustrative example, the user requests a subset of data from geospatial data 114 and geospatial data 116 which includes the criteria of the following: mailing addresses of residents with a median household income of $50,000, with a minimum of 2 school-age children, and living within a list of selected counties. To select the requested data, geospatial application 300 creates a query that requires a join of geospatial data 114 with geospatial data 116.

Different geospatial data sets can use different methods for aggregation of the data which create different shapes represented on a map. In the example, both FIG. 2A and FIG. 2B are keyed using the same (X,Y) coordinate system encompassing the same physical location, but FIG. 2A uses rectangular shapes to divide up the data while FIG. 2B uses curved shapes. The overlap of the shape sets of FIG. 2A and FIG. 2B can be seen in FIG. 2C. The shapes within FIG. 2A meeting the example criteria, such as the list of selected counties, include full shapes A, B, C, E, F, and G, which form a composite, or target shape illustrated in FIG. 2C by area 200. The shapes in FIG. 2B which meet the example criteria include the full shapes of a, b, c, d, f, g, h, i, k, l, m, n, and q, and portions of shapes e, j, o, p, r, s, and t, also illustrated in FIG. 2C by area 200.

Spatial database management systems in common geospatial applications, following Open Geospatial Consortium standards, allow relational joins between two geospatial data tables with different "shape sets" to be completed based on the intersection of their geometries. Geometry is a data type within spatial database management systems representing the shapes seen on geospatial data maps which bound aggregated data as two-dimensional objects. The shapes are defined by points or collections of points on the map which may represent lines, boxes, paths, or polygons. Spatial database management systems allow for spatial extended operations to be performed on geospatial database tables.

For example, a set intersection query is expressed as: ST_CONTAINS({A,B,C,E,F,G}, {a.dd}) where {A,B,C,E,F,G} is a sub-set of selected "rectangular" shapes from geospatial data 114 which form a target shape, and {a.dd} is a complete set of "curved" shapes from geospatial data 116. The intersection query is requesting all full shapes from geospatial data 116 that are completely enclosed in the composite shape described by {A,B,C,E,F,G}. The result set of the intersection query is {a,b,c,d,f,g,h,i,k,l,m,n,q} illustrated in FIG. 2D by area 202.

A set union query is expressed as: ST_OVERLAPS({A,B,C,E,F,G}, {a.dd}) where {A,B,C,E,F,G} is a sub-set of selected "rectangular" shapes from geospatial data 114 which form a target shape, and {a.dd} is a complete set of "curved" shapes from geospatial data 116. The union query is requesting all full shapes from geospatial data 116 that have at least some portion of a shape overlapping any part of the composite shape described by {A,B,C,E,F,G}. The result set of the union query is {a,b,c,d,e,f,g,h,i,j,k,l,m,n,o,p,q,r,s,t} illustrated in FIG. 2D by area 204.

Figure 2C:
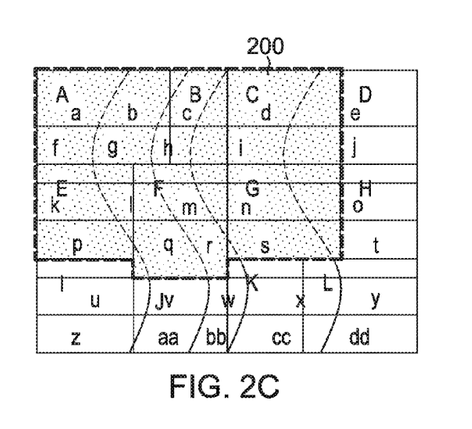
FIG. 2C is an illustration of a union query and an intersection query of two geospatial data sets, in accordance with an embodiment of the present invention.
Figure 2D:
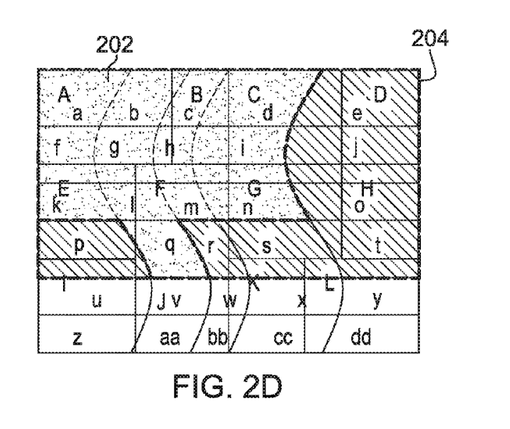
FIG. 2D is an illustration of an optimized join of two geospatial data sets, in accordance with an embodiment of the present invention.

Both the set intersection query and the set union query produce result sets comprised of full shapes from geospatial data 116, respectively area 202, and area 204 in FIG. 2D. The standard geospatial query process does not produce result sets comprising partial shapes. In the illustrative example, the optimal result set contains full shapes of {a,b,c,d,f,g,h,i,k,l,m,n,q}, and the partial shapes of {e,j,o,p,r,s,t} from geospatial data 116, identified by the overlap of the target shape {A,B,C,E,F,G} related to geospatial data 114. The target result set is illustrated in FIG. 2C by area 200. Embodiments of the present invention provide a spatial database management system which includes a set intersection query operation capable of determining a result set of full and partial shapes which matches area 200, instead of area 202 or area 204. One skilled in the art will recognize that area 202 is missing area from area 200, and that area 204 includes more area than area 200.

Figure 2E:
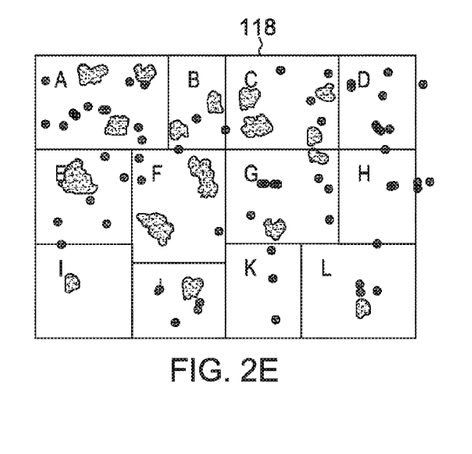
FIG. 2E is an illustration of a distribution data set, in accordance with an embodiment of the present invention.

Embodiments of the present invention disclose a method to apportion the data within partial shapes using a separate distribution data set, such as distribution data 118 in FIG. 2E, to best approximate the result set. Distribution data 118 shares the same geometry as one of the geospatial data sets from the query, or has a geometry of sufficient granularity that the shapes of the shape set combine to fit perfectly within the geometry of at least one of the geospatial data sets, such as very small squares, or individual points. In the illustration, distribution data 118 shares the same "shape set" or geometry as geospatial data 114. The data in each shape of geospatial data 114 is summary data which cannot be re-queried for the individual data points. Census demographic data is typically summary data within each shape on the geospatial map. Distribution data 118 is not summary data, but represents density or distribution of one or more variables within each shape. Distribution data 118 may include variables, such as residential vs. commercial property, land vs. water, or simply population, and may not relate exactly to the original distribution of data in geospatial data 114.

Geometry ratio calculator 400 determines the value of a select variable from distribution data 118 found within the area of a shape of geospatial data 114. Geometry ratio calculator 400 determines a ratio using values from the distribution data 118 related to the area of the partial shape being processed compared to the area of the full shape which fully encloses the partial shape. Geometry ratio calculator 400 multiplies the determined ratio with the values of the summary data within the full shape of geospatial data 114 to apportion the summary data for the partial shape. Geospatial application 300 creates the result set, which is a compilation of the data from the full shapes of geospatial data 114 and geospatial data 116, and the apportioned data from the partial shapes of geospatial data 116.

Figure 2F:
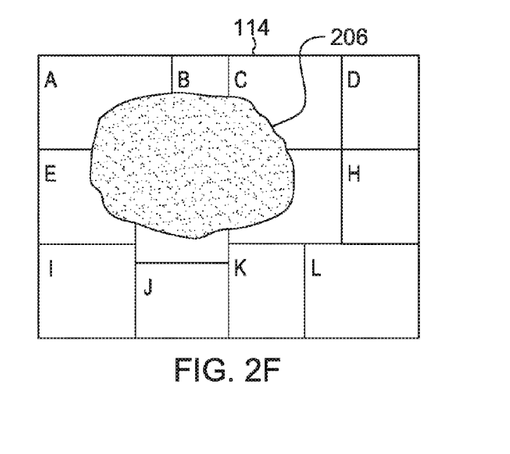
FIG. 2F is an illustration of a target shape overlaid onto a single geospatial data set, in accordance with an alternate embodiment of the present invention.

FIG. 2F is an illustration of a target shape overlaid onto a single geospatial data set, in accordance with an alternate embodiment of the present invention. Geospatial application 300 running on server computer 102 receives a request for data from client application 120. In the illustration of an alternate embodiment, the request for data includes criteria provided by the user for selecting a subset of data from a single spatial data set, such as geospatial data 114. The criteria includes a target shape, such as area 206, overlaid on a map representing geospatial data 114 as shown in FIG. 2F. Instead of being defined by a composite of shapes from a geospatial data set, a user creates the target shape as an arbitrary shape with a geometry different from the geometry of geospatial data 114.

Geospatial application 300 determines the full and partial shapes of geospatial data 114 within the target shape, or area 206. Distribution data 118 of FIG. 2E shares the same geometry as geospatial data 114 of FIG. 2A. Geometry ratio calculator 400 selects a variable of distribution data 118 found within the area of a shape of geospatial data 114. Geometry ratio calculator 400 determines a ratio using values from the distribution data 118 related to the area of the partial shape being processed compared to the area of the full shape which fully encloses the partial shape. Geometry ratio calculator 400 multiplies the determined ratio with the values of the summary data within the full shape of geospatial data 114 to apportion the summary data for the partial shape. Geospatial application 300 creates the result set, which is a compilation of the data encompassed within the full shapes, and the apportioned data from the partial shapes of geospatial data 114.

Figure 3:
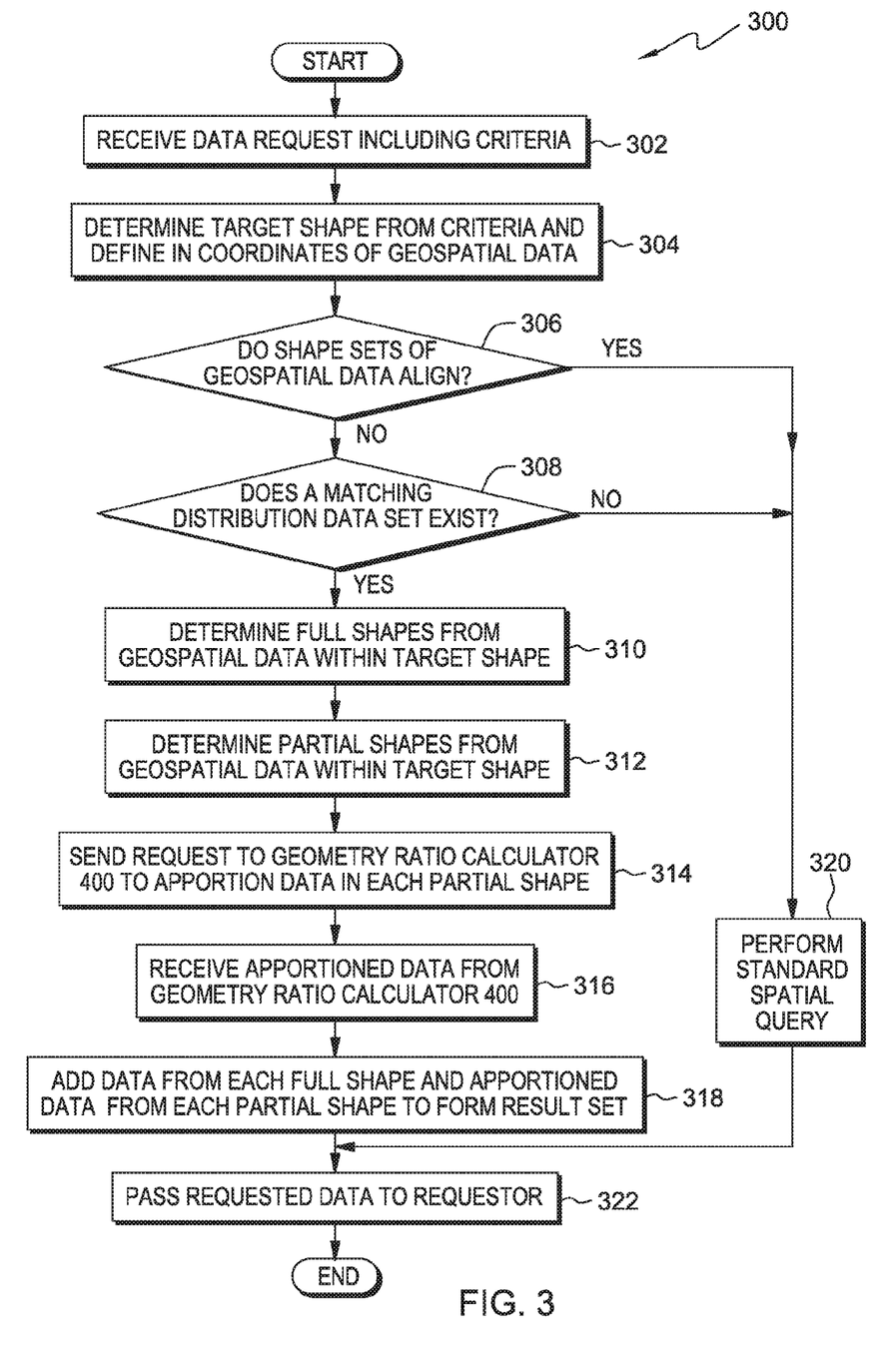
FIG. 3 is a flowchart depicting the operational steps of a geospatial application, in accordance with an embodiment of the present invention.

FIG. 3 is a flowchart depicting the operational steps of geospatial application 300, in accordance with an embodiment of the present invention. In the illustrative embodiment, geospatial application 300 running on server computer 102 receives a request for data which requires the joining of two geospatial databases including geospatial data 114 on server computer 102, and geospatial data 116 on server computer 104 available via network 110.

Geospatial application 300 receives a data request including criteria to select data within geospatial data 114 and geospatial data 116 (step 302). In the illustrative embodiment, geospatial application 300 running on server computer 102 receives a request for data from a user of client application 120 running on client computer 108 via network 110. In an alternate embodiment, the request for data may come from within geospatial application 300 on server computer 102, for example, a database administrator developing a new report, or publishing a tested report for use in the production environment.

The data request includes criteria for selecting a subset of data from within geospatial data 114 and geospatial data 116 which matches the criteria. To select the requested data, geospatial application 300 creates a query that includes a join of geospatial data 114 with geospatial data 116. A join is an operation used within relational databases to connect different tables of information by using values common to each. The join operation creates a result set that can be saved as a separate table, or used at that instance and then discarded.

Geospatial application 300 determines a target shape from criteria and defines the target shape in coordinates of geospatial data (step 304). A join between two databases requires fields common to each, but in the case of two geospatial databases where data is summarized or aggregated by different methods, the common fields are related to the shape sets or geometry type of each geospatial map. The methods for aggregation of data create different shapes represented on a map while using the same (X,Y) coordinate system. In the preceding example, geospatial data 114 had "rectangular" shapes, and geospatial data 116 had "curved" shapes. In the illustrative embodiment, geospatial application 300 uses criteria provided by the user to determine a target shape of the result set, which in the example, relates to the shapes within geospatial data 114 corresponding to a list of selected counties. The composite of these selected shapes becomes the target shape and is defined in the geospatial (X,Y) coordinate system. In an alternate embodiment, the target shape may be a complex polygon drawn by the user onto a geospatial map, and may be part of the criteria provided by the user for selecting a subset of data from one or both of geospatial data 114 and geospatial data 116.

Geospatial application 300 determines if the shape sets align for all geospatial data, such as geospatial data 114 and geospatial data 116 (decision block 306). Geospatial application 300 identifies all shapes within each geospatial database being queried. The shapes are defined in the geospatial databases by points or collections of points which represent points, lines, or polygons. Spatial tests exist that determine if one defined shape is completely located within another defined shape. Geospatial application 300 compares each shape definition from geospatial data 114 to all the defined shapes within geospatial data 116 to determine if the shape sets are equivalent and align, or are different and do not align.

If geospatial application 300 determines the shape sets do align for geospatial data 114 and geospatial data 116 (yes branch, decision block 306), geospatial application 300 performs a standard spatial query without optimization (step 320). If the shape sets for each database align, then the spatial query cannot be optimized further. The borders of shapes for both geospatial data 114 and geospatial data 116 would either have to be exactly the same, by having the same geospatial definitions of shapes, or the shapes of one geospatial database would have to be smaller and granular enough to form composite shapes that match the borders of shapes in the other geospatial database. If the borders align, no partial shapes will be found, and geospatial application 300 performs a standard query without needing to apportion shapes.

If geospatial application 300 determines the shape sets do not align for geospatial data 114 and geospatial data 116 (no branch, decision block 306), geospatial application 300 determines whether a matching distribution data set exists (decision block 308). If the borders of geospatial data 114 and geospatial data 116 do not align, partial shapes will be determined as part of the query, and geospatial application 300 may utilize a distribution data set, such as distribution data 118, to optimize the query using embodiments of the present invention. Distribution data 118 must align with at least one geospatial database, such as geospatial data 114, in order to apportion aggregated data for partial shapes within the target shape. In the example, geospatial application 300 compares each shape definition from geospatial data 114 to all the defined shapes within distribution data 118 to determine if the shape sets are equivalent and align, or are different and do not align.

If geospatial application 300 determines a matching distribution data set does not exist (no branch, decision block 308), geospatial application 300 performs a standard spatial query without optimization (step 320). Without a matching distribution data set, geometry ratio calculator 400 will not be able to apportion aggregated data within any partial shapes.

If geospatial application 300 determines a matching distribution data set does exist (yes branch, decision block 308), geospatial application 300 determines the set of full shapes from geospatial data 116 completely inside the target shape (step 310). The target shape is a composite of selected shapes from geospatial data 114, which when overlaid onto geospatial data 116 includes both full and partial shapes from geospatial data 116. To find the set of full shapes from geospatial data 116, geospatial application 300 performs an intersection query, as illustrated in the preceding example.

In the illustrative embodiment, geospatial application 300 determines the set of partial shapes from geospatial data 116 within the target shape (step 312). First, geospatial application 300 performs a union query, as illustrated in the preceding example, which includes all shapes of geospatial data 116 touching and partially overlapping the target shape. Geospatial data 300 subtracts the result of the intersection query from the result of the union query to determine the set of partial shapes from geospatial data 116 inside the target shape.

In an alternate embodiment, the function of determining the set of partial shapes inside the target shape may be performed in one step through the use of a new operation defined in geospatial application 300. This may be an extension of the spatial database management system which includes a new query format that allows this type of query or join automatically.

Geospatial application 300 sends a request to geometry ratio calculator 400 to apportion data in each partial shape (step 314). Geospatial application 300 sends each partial shape, either one at a time using a looping algorithm, or as a group to geometry ratio calculator 400. Geometry ratio calculator 400 takes each partial shape and creates an apportioned set of aggregated data utilizing a matching distribution data set. Geometry ratio calculator 400 is described further in FIG. 4A.

Geospatial application 300 receives apportioned data from geometry ratio calculator 400 (step 316). Geospatial application 300 receives apportioned data for each partial shape for each aggregated variable in geospatial data 116 from geometry ratio calculator 400. Geospatial application 300 receives apportioned data for each shape, either one at a time, or as a group from geometry ratio calculator 400.

Geospatial application 300 accumulates the data from full shapes and the apportioned data from partial shapes to form a result set (step 318). The result set can be saved as a separate table, or used at that instance and then discarded. Geospatial application 300 collects the aggregate data from both full and partial shapes to form a data set that may then be queried with the original criteria provided by the user.

Geospatial application 300 passes the requested data to the original requestor (step 322). Geospatial application 300 running on server computer 102 passes the requested data to the originating requestor, such as a user of client application 120 running on client computer 108 via network 110, or an administrative user of geospatial application 300 on server computer 102. The result set may eventually be published as part of a report for use in a production environment, and may be used for further refined queries by a user of client application 120.

Figure 4A:
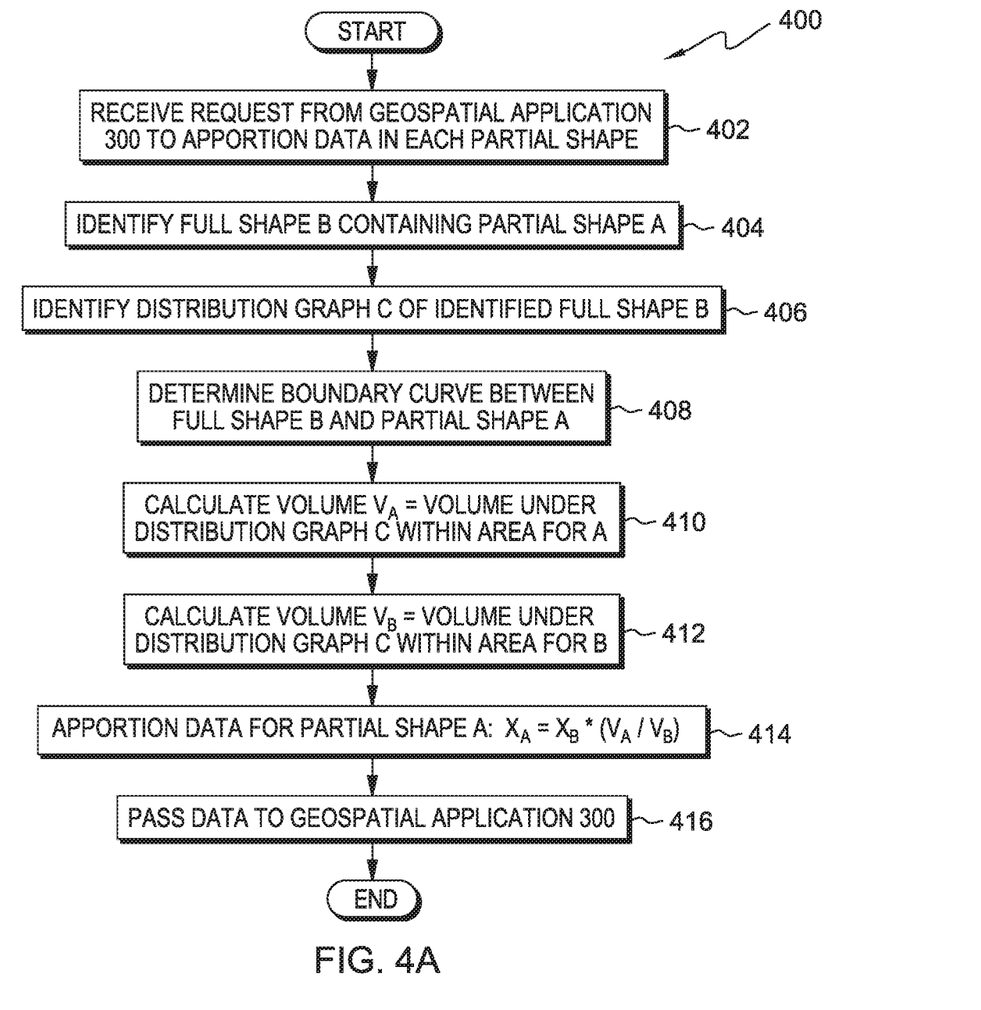
FIG. 4A is a flowchart depicting the operational steps of a geometry ratio calculator, in accordance with an embodiment of the present invention.

FIG. 4A is a flowchart depicting the operational steps of geometry ratio calculator 400, in accordance with an embodiment of the present invention. Geometry ratio calculator 400 takes a partial shape from a geospatial database, such as geospatial data 116, within a full shape from another geospatial database, such as geospatial data 114, and creates an apportioned set of aggregated data utilizing a matching distribution data set, such as distribution data 118.

Geometry ratio calculator 400 receives a request from geospatial application 300 to apportion data for each partial shape inside the target shape (step 402). Area 420 illustrates partial shape A in FIG. 4B. In the illustrative embodiment of the present invention, geospatial application 300 passes one partial shape for processing by geometry ratio calculator 400. In other embodiments, geospatial application 300 passes the list of partial shapes inside the target shape for processing by geometry ratio calculator 400. The illustrated flow of geometry ratio calculator 400, shown in FIG. 4A, follows the processing of one partial shape, but one skilled in the art will recognize that all the partial shapes inside the target shape may be processed as a group in a similar fashion.

Geometry ratio calculator 400 identifies full shape B containing partial shape A (step 404). Partial shape A from geospatial data 116, is defined to be completely encompassed by full shape B from geospatial data 114, illustrated by area 418 in FIG. 4B. Geometry ratio calculator 400 identifies the full shape from geospatial data 114 by using spatial extended operations within the spatial database management system. The shapes are defined in the geospatial databases by points or collections of points which represent points, lines, or polygons. Spatial tests exist that determine if one defined shape is completely located within another defined shape. Geometry ratio calculator 400 compares the partial shape A definition from geospatial data 116 to all the defined shapes within geospatial data 114 to identify full shape B which contains partial shape A.

Geometry ratio calculator 400 identifies the distribution graph of identified full shape B (step 406). In the illustrative embodiment of the present invention, distribution data 118 of FIG. 2E shares the same geometry as geospatial data 114 of FIG. 2A, and thus contains a full shape that shares the same geospatial definition as full shape B. Geometry ratio calculator 400 uses spatial tests to identify the full shape C, shown as area 422 in FIG. 4C, that shares the same geospatial outline as full shape B. In other embodiments, distribution data may not share the same geometry as geospatial data 114, but may include smaller shapes that can combine to form a composite shape that is equivalent to full shape B. In some embodiments, the smaller shapes may include points. Geometry ratio calculator 400 may use spatial queries to determine the composite shape that would be equivalent to full shape B, or C in FIG. 4C.

Geometry ratio calculator 400 determines the boundary curve between full shape B and partial shape A (step 408). Geometry ratio calculator 400 uses the geospatial definitions for partial shape A and full shape B to determine the boundary curve that separates partial shape A from the remainder of full shape B. The boundary curve is projected onto full shape C to enable calculation of the distribution data within full shape C that corresponds to the areas of partial shape A and full shape B.

Geometry ratio calculator 400 calculates the volume for partial shape A, $V_A$, which is equal to the volume under distribution graph C within the area for partial shape A (step 410). Geometry ratio calculator 400 projects the area for partial shape A in two dimensions onto distribution graph C, which includes three dimensions. Geometry ratio calculator 400 calculates the volume under distribution graph C within the boundaries of the projected area of partial shape A, and perpendicular to the projection of partial shape A.

Geometry ratio calculator 400 calculates the volume for full shape B, $V_B$, which is equal to the volume under distribution graph C within the area for full shape B (step 412). Geometry ratio calculator 400 projects the area for full shape B in two dimensions onto distribution graph C, which includes three dimensions. Geometry ratio calculator 400 calculates the volume under distribution graph C within the boundaries of the projected area of full shape B, and perpendicular to the projection of full shape B. In some embodiments, distribution graph C is the same shape as full shape B in two dimensions, which is the same as the area for full shape B projected onto distribution graph C.

Geometry ratio calculator 400 apportions data for partial shape A using the following equation: $X_A = X_B * (V_A/V_B)$ (step 414). Geometry ratio calculator 400 apportions data for partial shape A utilizing the following variables: $X_B$, $V_A$, and $V_B$. $X_B$ is the full value of an aggregated variable within geospatial data 114 for full shape B. $V_A$ is the volume of distribution graph C related to partial shape A, and calculated in step 410. $V_B$ is the volume of distribution graph C related to full shape B, and calculated in step 412. $X_A$ is the apportioned value of an aggregated variable within geospatial data 116 for partial shape A, and is calculated by multiplying $X_B$ by the ratio $(V_A/V_B)$. Geometry ratio calculator 400 calculates $X_A$ for each summarized or aggregated variable within geospatial data 116. The result includes an apportioned value for all the aggregated variables related to each partial shape. A person of ordinary skill in the art may recognize that there are other ways to calculate a ratio from distribution data for apportioning data within a partial shape of a spatial data set.

Geometry ratio calculator 400 passes requested apportioned data to geospatial application 300 (step 416). Geometry ratio calculator 400 passes the apportioned data to the requestor, such as Geospatial application 300 running on server computer 102. The apportioned data may be passed for one partial shape at a time, or for several partial shapes, depending on the original request.

Figure 4B:
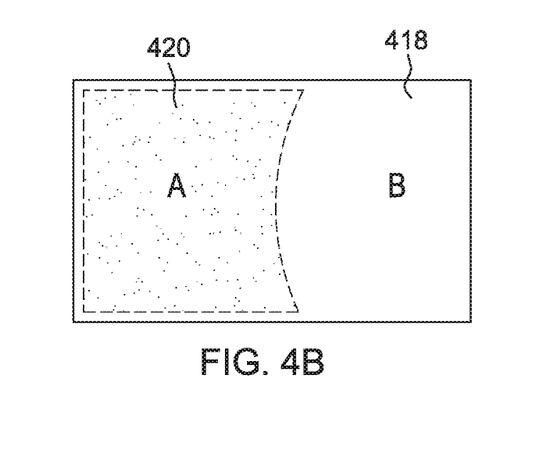
FIG. 4B is an illustration of a partial geospatial shape within a full shape, in accordance with an embodiment of the present invention.

FIG. 4B is an illustration of a partial geospatial shape within a full shape, in accordance with an embodiment of the present invention. Area 420 illustrates partial shape A in FIG. 4B. Partial shape A from geospatial data 116, is completely encompassed by full shape B from geospatial data 114, illustrated by area 418 in FIG. 4B. The aggregated data of full shape B can not be re-queried to divide the values of the data variables into values for partial shape A, or values for the remainder of full shape B. For example, the number of houses per county is a variable in geospatial data 114 that is summarized for the full shape B as a value of 14,500. The details of where those houses physically are within full shape B is no longer available, and thus can not be re-queried. A simple ratio of the area of partial shape A to full shape B could be used to apportion the data within partial shape A, but those skilled in the art will recognize that this can lead to skewed data.

Figure 4C:
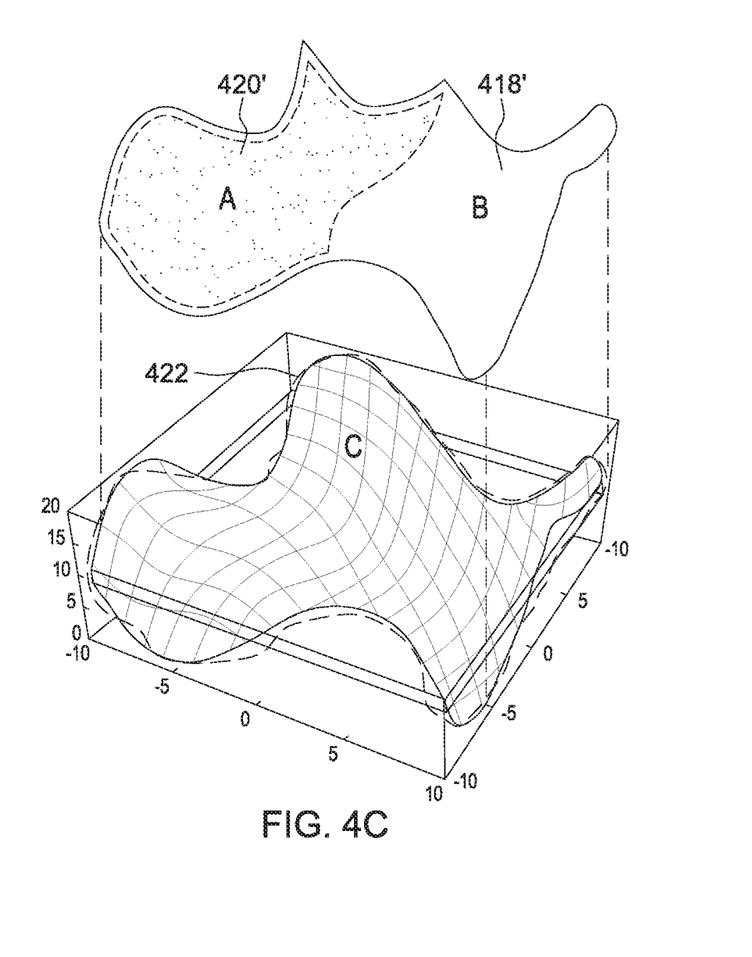
FIG. 4C is an illustration of partial shape A within full shape B projected on distribution graph C, in accordance with an embodiment of the present invention.

FIG. 4C is an illustration of partial shape A within full shape B projected on distribution graph C, in accordance with an embodiment of the present invention. The projection of partial shape A is shown as 420', and the projection of full shape B is shown as 418' in FIG. 4C. In the illustrative example, if the area within the remainder of full shape B is mostly water, then using a simple ratio, such as the area of A to the area of B, to determine the number of houses per county within partial shape A will produce a value much lower than the actual number. By using distribution data C, within area 422, which includes density information about useable land versus water, geometry ratio calculator 400 produces a value much closer to the actual number of houses within the area of partial shape A.

Figure 5:
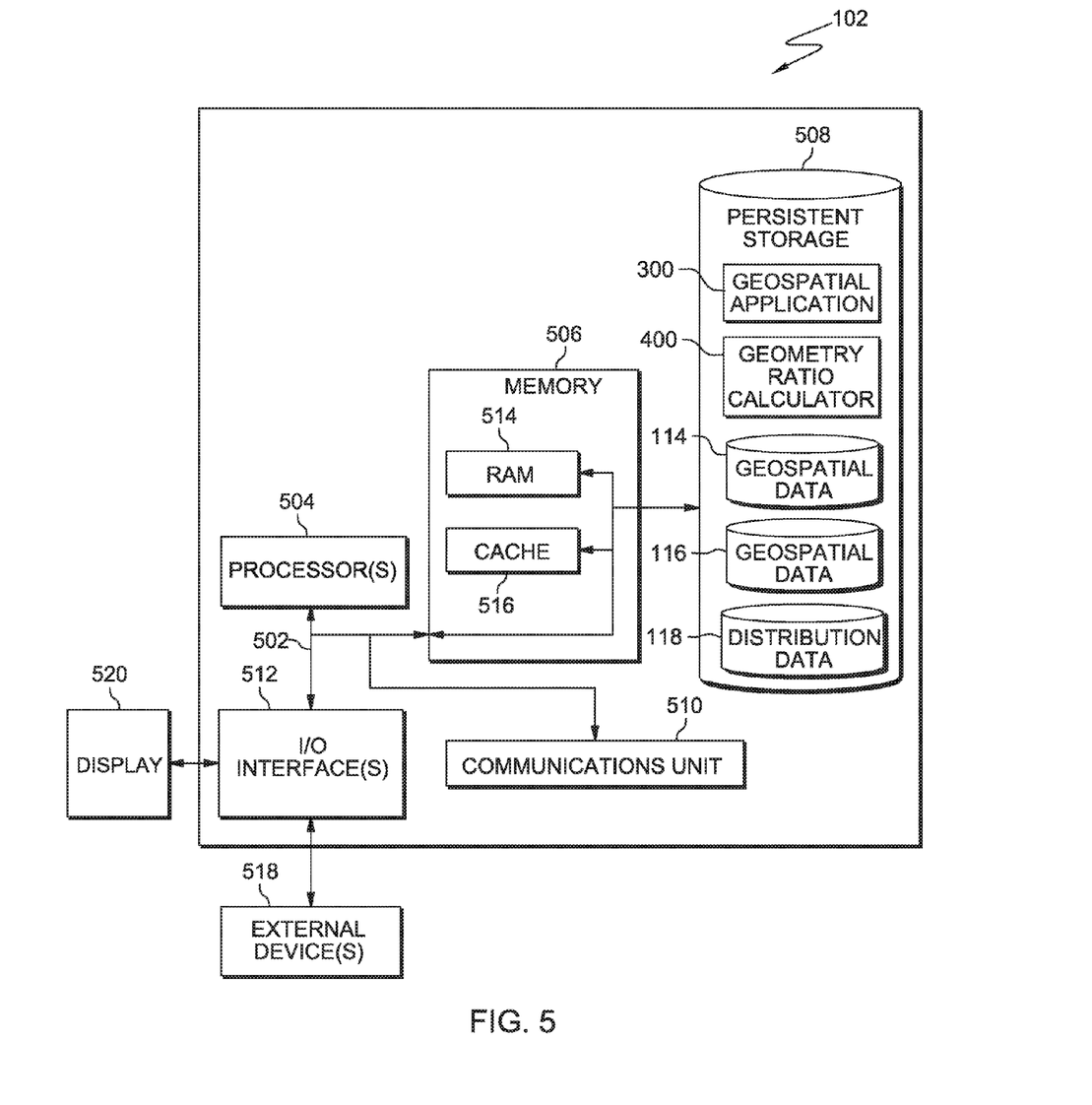
FIG. 5 depicts a block diagram of components of an exemplary computer system for implementing embodiments of the present invention.

FIG. 5 depicts a block diagram of components of server computer 102 in accordance with an illustrative embodiment of the present invention. It may be appreciated that FIG. 5 provides only an illustration of one implementation and does not imply any limitations with regard to the environments in which different embodiments may be implemented. Many modifications to the depicted environment may be made.

Server computer 102 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Geospatial application 300, geometry ratio calculator 400, geospatial data 114, geospatial data 116, and distribution data 118 are stored in persistent storage 508 for execution and/or access by one or more of the respective computer processors 504 via one or more memories of memory 506. Geospatial application 300 has access to geometry ratio calculator 400, geospatial data 114, geospatial data 116, and distribution data 118. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of server computers 102, 104, and 106, and client computer 108. In these examples, communications unit 510 includes one or more network interface cards. Communications unit 510 may provide communications through the use of either or both physical and wireless communications links. Geospatial application 300, geometry ratio calculator 400, geospatial data 114, geospatial data 116, and distribution data 118 may be downloaded to persistent storage 508 through communications unit 510.

I/O interface(s) 512 allows for input and output of data with other devices that may be connected to server computer 102. For example, I/O interface 512 may provide a connection to external device(s) 518 such as a keyboard, a keypad, a touch screen, and/or some other suitable input device. External device(s) 518 can also include portable computer-readable storage media such as, for example, thumb drives, portable optical or magnetic disks, and memory cards. Software and data used to practice embodiments of the present invention, e.g., geospatial application 300, geometry ratio calculator 400, geospatial data 114, geospatial data 116, and distribution data 118 can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for optimizing spatial queries, the method comprising:
a computer receiving a first spatial data set and a target spatial shape, wherein a geometry of the first spatial data set does not align with a geometry of the target spatial shape;
the computer receiving a distribution data set, wherein a geometry of the distribution data set aligns with the geometry of the first spatial data set;
the computer performing one or more geospatial queries to determine a list of full and partial shapes of the first spatial data set which are located within the target spatial shape;
the computer determining a ratio for a determined partial shape of the first spatial data set using the distribution data set;
the computer determining an apportioned value of a variable of the first spatial data set within the determined partial shape, wherein the apportioned value of the variable is based on a full value of the variable and the determined ratio; and
the computer outputting a result set comprising the apportioned value of the variable.

2. The method of claim 1, further comprising:
the computer determining that the geometry of the first spatial data set does not align with the geometry of the target spatial shape, wherein i.) the geometry of the first spatial data set includes at least one shape defined by points, lines, or polygons, ii.) the geometry of the target spatial shape includes at least one shape defined by points, lines, or polygons, iii.) the first spatial data set encompasses the target spatial shape, and iv.) a sub-set of one or more full shapes within the first spatial data set cannot be combined to form a composite shape equivalent to the target spatial shape.

3. The method of claim 1, further comprising:
the computer determining that the geometry of the distribution data set aligns with the geometry of the first spatial data set, wherein i.) the geometry of the distribution data set includes at least one shape defined by points, lines, or polygons, and ii.) a sub-set of one or more full shapes within the distribution data set can be combined to form a composite shape equivalent to each full shape within the first spatial data set.

4. The method of claim 1, wherein the computer determining a ratio for a determined partial shape of the first spatial data set using the distribution data set comprises:
the computer identifying a full shape of the first spatial data set which encompasses the determined partial shape of the first spatial data set;
the computer identifying a composite shape of the distribution data set which is equivalent to the identified full shape of the first spatial data set;
the computer determining a boundary curve that separates the identified full shape of the first spatial data set with the determined partial shape of the first spatial data set; and
the computer determining a ratio of a data density from the distribution data set within the determined partial shape of the first spatial data set compared to a data density from the distribution data set within the identified composite shape of the distribution data set.

5. The method of claim 4, further comprising:
the computer determining the data density from the distribution data set by calculating a volume under a graph of the distribution data set.

6. The method of claim 1, further comprising:
the computer receiving a second spatial data set, wherein the geometry of the first spatial data set does not align with a geometry of the second spatial set; and
the computer performing one or more geospatial queries to determine a list of full and partial shapes from the second spatial data set which are located within the target spatial shape.

7. The method of claim 1, further comprising:
the computer receiving a second spatial data set and criteria which defines the target spatial shape from a sub-set of one or more full shapes within the second spatial data set.

8. A computer program product for optimizing spatial queries, the computer program product comprising:
one or more computer-readable storage media and program instructions stored on the one or more computer-readable storage media, the program instructions comprising:
program instructions to receive a first spatial data set and a target spatial shape, wherein a geometry of the first spatial data set does not align with a geometry of the target spatial shape;
program instructions to receive a distribution data set, wherein a geometry of the distribution data set aligns with the geometry of the first spatial data set;
program instructions to perform one or more geospatial queries to determine a list of full and partial shapes of the first spatial data set which are located within the target spatial shape;
program instructions to determine a ratio for a determined partial shape of the first spatial data set using the distribution data set;
program instructions to determine an apportioned value of a variable of the first spatial data set within the determined partial shape, wherein the apportioned value of the variable is based on a full value of the variable and the determined ratio; and
program instructions to output a result set comprising the apportioned value of the variable.

9. The computer program product of claim 8, further comprising:
program instructions to determine that the geometry of the first spatial data set does not align with the geometry of the target spatial shape, wherein i.) the geometry of the first spatial data set includes at least one shape defined by points, lines, or polygons, ii.) the geometry of the target spatial shape includes at least one shape defined by points, lines, or polygons, iii.) the first spatial data set encompasses the target spatial shape, and iv.) a sub-set of one or more full shapes within the first spatial data set cannot be combined to form a composite shape equivalent to the target spatial shape.

10. The computer program product of claim 8, further comprising:
program instructions to determine that the geometry of the distribution data set aligns with the geometry of the first spatial data set, wherein i.) the geometry of the distribution data set includes at least one shape defined by points, lines, or polygons, and ii.) a sub-set of one or more full shapes within the distribution data set can be combined to form a composite shape equivalent to each full shape within the first spatial data set.

11. The computer program product of claim 8, wherein program instructions to determine a ratio for a determined partial shape of the first spatial data set using the distribution data set comprises:
program instructions to identify a full shape of the first spatial data set which encompasses the determined partial shape of the first spatial data set;
program instructions to identify a composite shape of the distribution data set which is equivalent to the identified full shape of the first spatial data set;
program instructions to determine a boundary curve that separates the identified full shape of the first spatial data set with the determined partial shape of the first spatial data set; and
program instructions to determine a ratio of a data density from the distribution data set within the determined partial shape of the first spatial data set compared to a data density from the distribution data set within the identified composite shape of the distribution data set.

12. The computer program product of claim 11, further comprising:
program instructions to determine the data density from the distribution data set by calculating a volume under a graph of the distribution data set.

13. The computer program product of claim 8, further comprising:
program instructions to receive a second spatial data set, wherein the geometry of the first spatial data set does not align with a geometry of the second spatial set; and
program instructions to perform one or more geospatial queries to determine a list of full and partial shapes from the second spatial data set which are located within the target spatial shape.

14. The computer program product of claim 8, further comprising:
program instructions to receive a second spatial data set and criteria which defines the target spatial shape from a sub-set of one or more full shapes within the second spatial data set.

15. A computer system for optimizing spatial queries, the computer system comprising:
one or more computer processors;
one or more computer-readable storage media;
program instructions stored on the computer-readable storage media for execution by at least one of the one or more processors, the program instructions comprising:
program instructions to receive a first spatial data set and a target spatial shape, wherein a geometry of the first spatial data set does not align with a geometry of the target spatial shape;
program instructions to receive a distribution data set, wherein a geometry of the distribution data set aligns with the geometry of the first spatial data set;
program instructions to perform one or more geospatial queries to determine a list of full and partial shapes of the first spatial data set which are located within the target spatial shape;
program instructions to determine a ratio for a determined partial shape of the first spatial data set using the distribution data set;
program instructions to determine an apportioned value of a variable of the first spatial data set within the determined partial shape, wherein the apportioned value of the variable is based on a full value of the variable and the determined ratio; and
program instructions to output a result set comprising the apportioned value of the variable.

16. The computer system of claim 15, further comprising:
program instructions to determine that the geometry of the first spatial data set does not align with the geometry of the target spatial shape, wherein i.) the geometry of the first spatial data set includes at least one shape defined by points, lines, or polygons, ii.) the geometry of the target spatial shape includes at least one shape defined by points, lines, or polygons, iii.) the first spatial data set encompasses the target spatial shape, and iv.) a sub-set of one or more full shapes within the first spatial data set cannot be combined to form a composite shape equivalent to the target spatial shape.

17. The computer system of claim 15, further comprising:
program instructions to determine that the geometry of the distribution data set aligns with the geometry of the first spatial data set, wherein i.) the geometry of the distribution data set includes at least one shape defined by points, lines, or polygons, and ii.) a sub-set of one or more full shapes within the distribution data set can be combined to form a composite shape equivalent to each full shape within the first spatial data set.

18. The computer system of claim 15, wherein program instructions to determine a ratio for a determined partial shape of the first spatial data set using the distribution data set comprises:
program instructions to identify a full shape of the first spatial data set which encompasses the determined partial shape of the first spatial data set;
program instructions to identify a composite shape of the distribution data set which is equivalent to the identified full shape of the first spatial data set;
program instructions to determine a boundary curve that separates the identified full shape of the first spatial data set with the determined partial shape of the first spatial data set; and
program instructions to determine a ratio of a data density from the distribution data set within the determined partial shape of the first spatial data set compared to a data density from the distribution data set within the identified composite shape of the distribution data set.

19. The computer system of claim 18, further comprising:
program instructions to determine the data density from the distribution data set by calculating a volume under a graph of the distribution data set.

20. The computer system of claim 15, further comprising:
program instructions to receive a second spatial data set, wherein the geometry of the first spatial data set does not align with a geometry of the second spatial set; and
program instructions to perform one or more geospatial queries to determine a list of full and partial shapes from the second spatial data set which are located within the target spatial shape.

* * * * *